United States Patent
Takagi et al.

(10) Patent No.: US 7,598,848 B2
(45) Date of Patent: Oct. 6, 2009

(54) APPARATUS AND METHOD OF PEDESTRIAN RECOGNITION

(75) Inventors: Kiyokazu Takagi, Okazaki (JP);
Masafumi Hashimoto, 3-33-4 Kizugawadai, Kizu-cho, Souraku-gun, Kyoto-pref. (JP) 619-0225

(73) Assignees: Denso Corporation, Kariya (JP);
Masafumi Hashimoto, Souraku (JP)

(*) Notice: Subject to any disclaimer, the term of this patent is extended or adjusted under 35 U.S.C. 154(b) by 340 days.

(21) Appl. No.: 11/804,976

(22) Filed: May 21, 2007

(65) Prior Publication Data
US 2008/0019567 A1 Jan. 24, 2008

(30) Foreign Application Priority Data
Jul. 18, 2006 (JP) ............... 2006-196124

(51) Int. Cl.
*B60Q 1/00* (2006.01)
(52) U.S. Cl. .......... 340/436; 340/435; 340/903; 340/944; 701/301; 180/275
(58) Field of Classification Search ......... 340/944, 340/435, 436, 902–905, 539.1, 539.13, 426.16; 701/45, 301, 302; 382/103, 107; 180/275–280
See application file for complete search history.

(56) References Cited

U.S. PATENT DOCUMENTS

| | | | | |
|---|---|---|---|---|
| 6,873,251 B2* | 3/2005 | Schiffmann et al. | ......... | 340/436 |
| 6,956,469 B2* | 10/2005 | Hirvonen et al. | ............ | 340/435 |
| 7,330,568 B2* | 2/2008 | Nagaoka et al. | ............ | 382/104 |
| 7,418,112 B2* | 8/2008 | Ogasawara | ................. | 382/103 |
| 2007/0274566 A1 | 11/2007 | Fujimoto | | |

FOREIGN PATENT DOCUMENTS

| | | |
|---|---|---|
| DE | 103 53 347 | 6/2005 |
| DE | 10 2006 001033 | 9/2006 |
| JP | 2000-003499 | 1/2000 |

OTHER PUBLICATIONS

Office Action dated Nov. 27, 2008 in German Application No. 10 2007 023 888.8.
Kay Ch. Fuerstenberg and Klaus Dietmayer, "Object Tracking And Classification for Multiple Active Safety and Comfort Applications Using a Multilayer Laserscanner", 2004 IEEE Intelligent Vehicles Symposium, Jun. 14-17, 2004; pp. 802-807.
K. Takagi, S.Ando, M.Hashimoto, "Pedestrian Recognition Using On-vehicle LIDAR"; published May 24, 2006 with partial translation.

* cited by examiner

*Primary Examiner*—Anh V La
(74) *Attorney, Agent, or Firm*—Harness, Dickey & Pierce, PLC

(57) ABSTRACT

An apparatus having a laser radar is used to recognize a pedestrian by detecting a position of reflective objects, mapping the objects in a two-dimensional coordinate system, determining whether the objects are moving, and grouping moving objects closely located with each other. Based on a size of an object group, the pedestrian associated with the object group is accurately recognized.

12 Claims, 6 Drawing Sheets

RADAR

TRACE OF VEHICLE

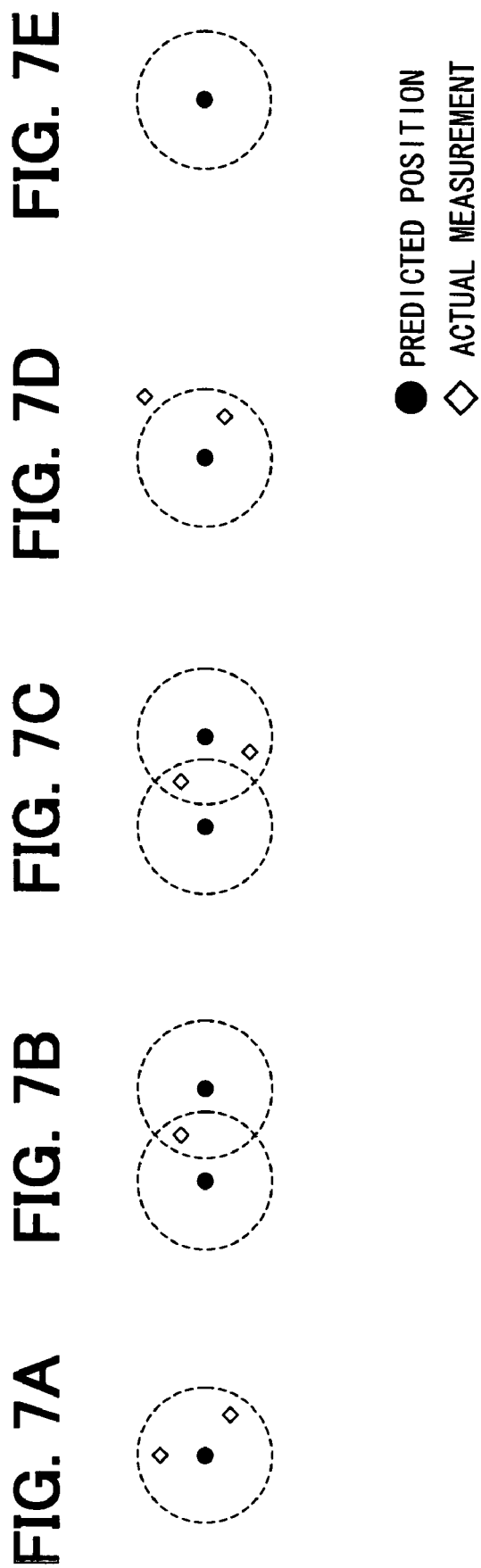

APPARATUS AND METHOD OF PEDESTRIAN RECOGNITION

CROSS REFERENCE TO RELATED APPLICATION

This application is based on and claims the benefit of priority of Japanese Patent Application No. 2006-196124 filed on Jul. 18, 2006, the disclosure of which is incorporated herein by reference.

FIELD OF THE INVENTION

The present invention generally relates to a pedestrian recognition apparatus for use in a vehicle.

BACKGROUND INFORMATION

In recent years, a pedestrian detection system that distinguishes a pedestrian from a vehicle, a standing structure has been disclosed in, for example, Japanese patent document JP-A-2000-3499. The pedestrian detection system in the disclosure detects a pedestrian or a group of pedestrians by forming groups of laser reflection points having an interval within a predetermined value based on a laser radar scanning in front of a subject vehicle, by calculating a moving speed of a center of each groups based on a change of a distance between the group and the subject vehicle, and by categorizing the groups based on a predetermined variance value and predetermined moving speed of the center of the grouped reflection points.

However, the pedestrian detection system of the above disclosure performs grouping of the laser reflection points within the predetermined interval regardless of the moving speed of the reflection points, that is, whether the reflection points are moving or stopping. Therefore, the pedestrian detection system may possibly categorize stopping objects and moving objects into one group when both objects are detected within the predetermined interval, thereby deteriorating pedestrian detection accuracy due to the change of the variance value of the erroneously grouped objects.

SUMMARY OF THE INVENTION

In view of the above and other problems, the present invention provides an apparatus and method of pedestrian recognition that can accurately recognize a moving pedestrian.

The pedestrian recognition apparatus in the present disclosure includes a radar unit for emitting a radar beam therefrom and receiving a reflected beam reflected by a reflective object when scanning of a detection area by the radar beam is performed in plural scan lines at a predetermined detection interval, a reflective object detection unit for detecting a position of the reflective object as two-dimensional coordinates in a predetermined coordinate system based on a result of emission of the radar beam and reception of the reflected beam by the radar unit, an object determination unit for determining whether the reflective object is a stopping object or a moving object based on a positional change of the reflective object represented by the two-dimensional coordinates in the predetermined coordinate system derived from plural times of position detection of the reflective object at the predetermined detection interval, and a pedestrian recognition unit for recognizing a pedestrian, wherein pedestrian recognition is performed as formation of an object group of close-by reflective objects for forming an object group of the reflective objects in the two-dimensional coordinates in the predetermined coordinate system out of the reflective objects determined as the moving object based on a determination result by the object determination unit, the formation of the object group succeeded by determination of a group size of the object group based on a predetermined criterion of the group size for associating the object group with the pedestrian.

The pedestrian recognition apparatus distinguishes moving object out of the reflective objects detected by the radar unit based on positional change of the objects scanned in plural times at predetermined interval, and forms an object group by grouping close-by reflective objects. Then, the object group is recognized as the pedestrian based on a size of the object group. In this manner, the pedestrian in front of a vehicle is accurately detected and recognized.

The method of recognizing the pedestrian is generally based on a recognition scheme of the pedestrian recognition apparatus described above, thereby accurately recognizing the pedestrian.

BRIEF DESCRIPTION OF THE DRAWINGS

Other objects, features and advantages of the present invention will become more apparent from the following detailed description made with reference to the accompanying drawings, in which:

FIGS. 7A to 7E show illustrations of relationship between a predicted position of a tracked object in an estimation area and an actual measurement

DETAILED DESCRIPTION

Preferred embodiments of the present invention will now be described with reference to the accompanying the drawings.

Figure 1:
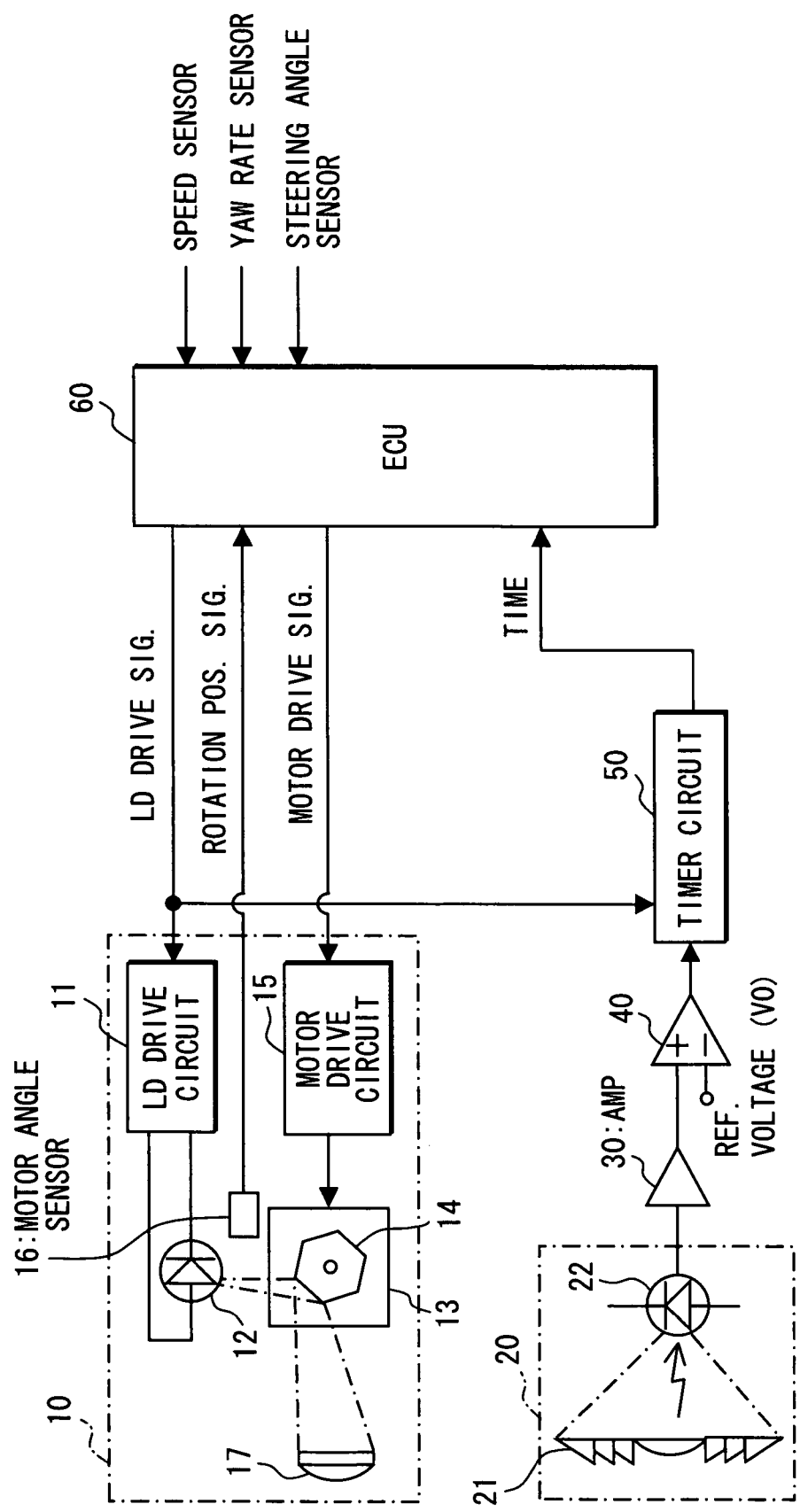
FIG. 1 shows a block diagram of a pedestrian recognition apparatus in an embodiment of the present disclosure.

FIG. 1 shows a block diagram of a pedestrian recognition apparatus in an embodiment of the present disclosure. The pedestrian recognition apparatus is disposed on a vehicle and is used to recognize a moving pedestrian in a proximity of the vehicle, especially in front of the vehicle.

The recognition result of the pedestrian recognition apparatus is transferred to, for example, a pedestrian warning apparatus, a pedestrian protection apparatus or the like (not shown in the figure). The pedestrian warning apparatus notifies, for example, a driver of the vehicle of a moving pedestrian in front of the vehicle. Therefore, the driver can take precautions against the pedestrian while driving the vehicle. In case that a contact with the pedestrian is unavoidable, the pedestrian protection apparatus deploys an air bag installed in a bumper or in a hood to protect the pedestrian in a best possible manner.

As shown in FIG. 1, the pedestrian recognition apparatus includes a laser radar having a light emission unit 10, a light reception unit 20, an ECU 60 and the like. The light emission unit 10 and the light reception unit 20 are disposed in a front part of the vehicle so as to detect a pedestrian in front of the vehicle.

The light emission unit 10 has a semiconductor laser diode 12 that emits a pulsing laser beam through a scanner 13 and an emission lens 17. The laser diode 12 is coupled with the ECU 60 through a laser diode drive circuit 11, and emits the laser beam upon receiving a laser diode drive signal from the ECU 60. The scanner 13 has a polygon mirror 14 for reflecting the laser beam while it is rotated by a motor (not shown). The scanner 13 is driven by a motor drive signal from the ECU 60 when the motor drive signal is inputted to a motor drive circuit 15, thereby rotating the polygon mirror 14. The rotation angle of the motor is detected by a motor angle sensor 16 and is outputted to the ECU 60 as a rotation position signal.

The polygon mirror 14 has six mirrors (reflective surfaces) having respectively different slant angles. Therefore, an intermittent emission of the laser beam from the laser diode 12 can be redirected to scan a predetermined range of horizontal and vertical angle when the mirror 14 is rotated in a predetermined speed. The range of scanning defines a laser radar detection area that extends in both of the horizontal and vertical directions, that is, the width and height directions of the vehicle.

The light reception unit 20 has a light reception lens 21 that receives a reflected laser beam being reflected by an object such as a pedestrian or the like. The reflected beam is converged by the light reception lens 21 on a photo diode 22. The photo diode 22 outputs a voltage that is proportional to the reflected beam. The output voltage of the photo diode 22 is amplified by an amplifier 30, and is outputted to a comparator 40. The comparator 40 compares the output voltage of the amplifier 30 with a reference voltage V0. When the output voltage of the amplifier 30 is greater than the reference voltage V0, a predetermined light reception signal is outputted to a timer circuit 50.

The timer circuit 50 has an input of the laser diode drive signal that is also directed to the laser diode drive circuit 11 from the ECU 60. The timer circuit 50 codes time interval between an output of the laser diode drive signal and generation of a light reception signal, that is, a time difference between an emission time of the laser beam and a reception time of the reflected beam as a binary digital signal. Further, the timer circuit 50 measures a period of time when the light reception signal surpasses the reference voltage V0, and codes the period as the binary digital signal. Then, those binary digital signals are inputted to the ECU 60 as digital data of time measurement. The surpassing period of time has a correlation with an intensity of the reflected beam, and is utilized as reflected beam intensity information.

The laser radar detection area, or, a laser beam projection area, is defined in the following manner. That is, the light emission unit 10 emits the laser beams of 451 units, each beam having a step angle of 0.08 degrees, in a vehicle-width direction. Therefore, a laser beam projection area in the vehicle-width direction is equal to an angle of ±18 degrees (=0.08 deg×451).

Figure 2:
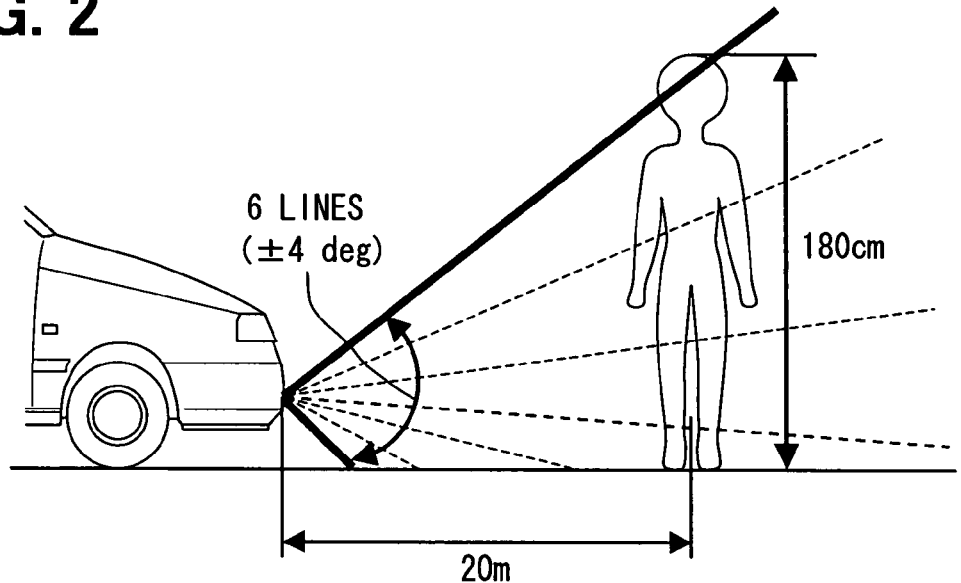
FIG. 2 shows an illustration of a detection area of a laser radar.

As shown in FIG. 2, the light emission unit 10 uses the polygon mirror 14 having six mirrors to reflect the laser beam in six lines of different height. The laser beams in the six lines are used to detect an object in front of the vehicle, such as a leading vehicle, a delineator, a sign board, a line marker on a road surface, and the like.

The laser beam can captured the pedestrian in upper four lines, for example, as shown in FIG. 2, when the pedestrian of 180 cm in height stands at a distance of 20 meters from the vehicle. The reflected laser beams are received by the laser radar. Further, when the pedestrian is closer to the vehicle, upper five lines of the laser beam may capture the pedestrian. In this manner, the pedestrian captured in plural lines of the laser beam spread in the height direction is coded as digital data with pedestrian characteristics to be distinguished from other objects.

The laser beam has a beam angle of about 1.6 degrees in the height direction, and two adjacent lines of the laser beam in the height direction are set to partially overlap with each other. Therefore, the resolution of the laser beam in the height direction is improved. The overlapping angle of the laser beam in the height direction is 0.2 degrees. Thus, the laser beam projection area in the height direction is approximately in an angle of ±4 degrees (=1.6 deg ×6 lines −0.2 deg ×5 overlapping areas).

When the light emission unit 10 actually emits the laser beam for scanning an object in front of the vehicle, the ECU 60 outputs to the light emission unit 10 the laser diode drive signal for two-dimensional scanning in the above-described projection area. Therefore, the reflected beam in the two-dimensional scanning uniquely determines the projection angle of the laser beam that has originated the reflected beam.

Further, when the ECU 60 has an input of the time difference between the emission time of the laser beam and the reception time of the reflected beam, the ECU 60 calculates the distance to the object based on the time difference. The ECU 60 generates position data based on the calculated distance and the projection angle of the laser beam. That is, a middle point of the light emission unit 10 and the light reception unit 20 is defined as an origin (0, 0, 0), and the vehicle-width direction/the vehicle traveling direction/the vehicle-height direction are respectively defined as x axis/y axis/z axis in a sensor coordinate system for locating a position of the object as x/y/z coordinates. Further, the reflected beam intensity data that corresponds to the surpassing period when the reception signal surpasses the reference voltage V0 is stored in association with the x/y/z coordinates.

Furthermore, the ECU 60 has inputs from a speed sensor, a yaw rate sensor, a steering angle sensor and the like for detecting a vehicle speed, a yaw rate, a steering angle and the like. The ECU 60 calculates a vehicle motion (an amount of traveling) based on detection signals from those sensors.

The pedestrian recognition apparatus having the above-described structure executes a process for recognizing a pedestrian in the following manner.

Figure 3:
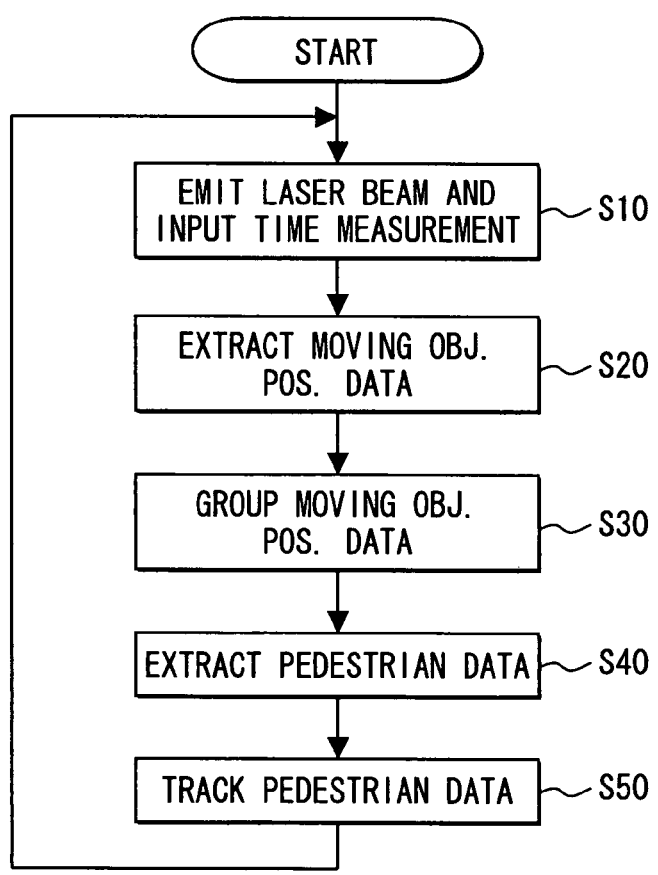
FIG. 3 shows a flowchart of a pedestrian recognition process performed in an ECU of the pedestrian recognition apparatus.

FIG. 3 shows a flowchart of a pedestrian recognition process performed in the ECU 60 of the pedestrian recognition apparatus.

In step S10, the process controls the apparatus to emit the laser beam to scan the detection area, and inputs the time measurement data to the ECU 60 when the reflected beam is received. In this case, detection interval of the laser radar is, for example, set to 100 milliseconds.

In step S20, the process executes a moving object extraction process that extracts moving object position data from the reflected beam data. In the extraction process, the motion of the vehicle such as a position, a speed, a yaw angle and the like is calculated based on the speed, the yaw rate, the steering angle and the like. The motion of the vehicle is calculated, for example, by using a front-rear two wheel model (Bicycle model). For the improvement of the accuracy, the calculation of the motion is preferably executed in an interval shorter than the measurement interval of the laser radar. The calculation interval may be, for example, an interval of 12 milliseconds.

An example of the motion calculation method is explained in the following. The estimation of a position of the vehicle and a traveling direction is performed based on detected data of the vehicle speed and the steering angle. The steering angle and curvature of turning are correlated based on a predefined table, and the curvature corresponding to the steering angle of the traveling vehicle is derived from the table. In this case, an intermediate value that is not defined in the table may preferably be calculated by a liner interpolation. Then, a curvature $\gamma$, the speed of the vehicle v, a sampling interval T are used to define a bias angle $\theta$ of the vehicle. That is, an angular motion of the vehicle can be described in the following equation that defines the bias angle $\theta$.

$$\theta = \gamma v T \text{ (rad)} \quad \text{[Equation 1]}$$

Therefore, the motion of the vehicle at the sampling interval T is calculated as $\Delta X = 1/\gamma(1-\cos\theta)$ in a lateral direction and $\Delta Y = 1/\gamma \sin\theta$ in a front-rear direction.

Based on the lateral and front-rear motion, the position of the vehicle in an absolute coordinate system is calculated. That is, a current position of the vehicle is calculated by adding $\Delta X$ and $\Delta Y$ to the coordinates of the previous position $(X, Y)$. In this manner, the current position of the vehicle is defined as $(X+\Delta X, Y+\Delta Y)$ in the absolute coordinate system.

The origin of the absolute coordinate system may be arbitrarily defined as a start point of the travel of the vehicle, a start point of laser radar measurement or the like. The origin of the coordinate may preferably determined as a point on a traveling route of the vehicle. By defining the origin as a point on the traveling route, the position of the vehicle in the absolute coordinate system can be derived only from the motion of the vehicle.

The coordinates value of the vehicle position in the absolute coordinate system can be calculated by successively adding the coordinates value of the motion of the vehicle at each interval. In this case, the model in this calculation assumes that the vehicle travels at a low speed, the tire does not slip, and the slip angle is 0 (zero). However, as the speed of the vehicle increases, the slip angle also gradually increases. Therefore, the model may be switched to the one that takes the slip angle into account (motion equation). The speed at which the model is switched may be determined according to vehicle characteristics. The switching speed may preferably be determined as a hysteresis curve, that is, respectively different switching speeds may be used for the vehicle at an acceleration and for the vehicle at a deceleration. Further, the model may change the slip rate continuously when the speed of the vehicle increases for determination of the position of the vehicle.

Figure 4A:
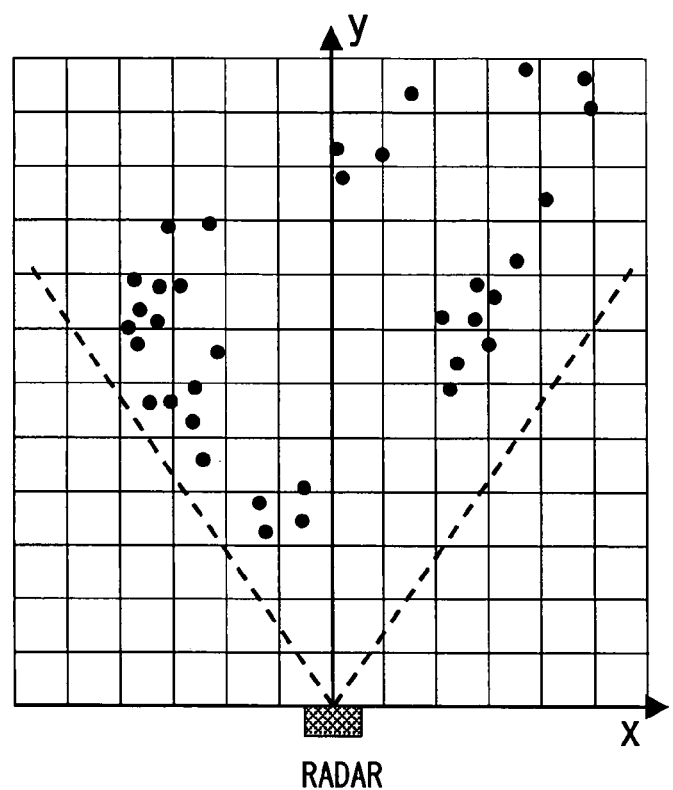
FIGS. 4A and 4B show illustrations of a conversion process of a position of a reflective object in a sensor coordinate system to a position in an absolute coordinate system.

In this manner, the position data (position coordinates) derived from the process in step S10 is used to calculates the position of each reflective object in the absolute coordinate system after determining the position of the vehicle. That is, as shown in FIG. 4A, the position data of the reflective object in the sensor coordinate system that uses the position of the laser radar as its origin is transformed in the position data in the absolute coordinates shown in the illustration in FIG. 4B.

In the sensor coordinate system, the position data of the reflective objects of the current positions and the previous positions cannot be handled in an integrated fashion unless all of the position data of the reflective objects are updated at every detection interval, because the position of the vehicle (i.e., the position of the laser radar) is defined as the origin. On the other hand, the previous positions of the vehicle and the reflective objects can be integrally handled by storing the position data in the absolute coordinate system, and continuity can be provided by transforming only the current position data to the coordinates in the absolute coordinate system.

Figure 4B:
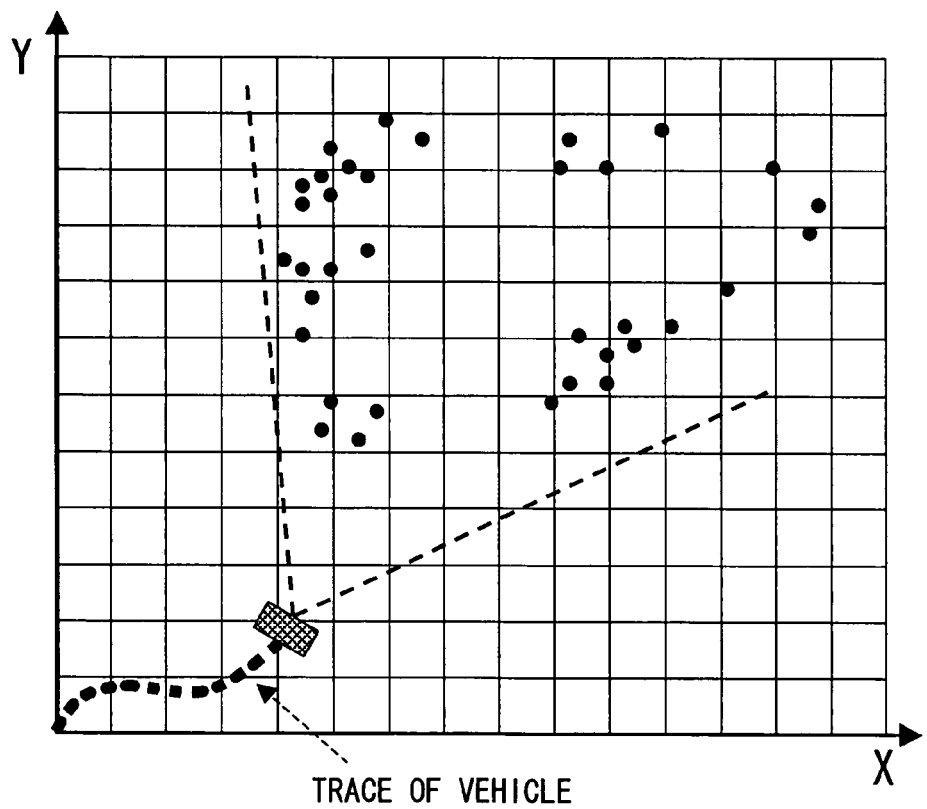

The position coordinates of the reflective objects in the sensor coordinate system can be transformed to the position coordinates in the absolute coordinate system by rotating the y axis of the sensor coordinate system to be aligned with the travel direction of the vehicle in the absolute coordinate system as shown in FIG. 4B. The coordinates in the x axis and z axis, that is, the vehicle-width direction and the front-rear direction, can be transformed to the absolute coordinates accordingly after positioning the vehicle in the absolute coordinate system.

In the present embodiment, the configuration of the laser beam is determined so that the upper 4 or 5 lines of the laser beam captures the pedestrian. Therefore, when the reflective object is the pedestrian, height information is retained as the z coordinate in the sensor coordinate system as shown in FIG. 4A. When the coordinates are transformed to the absolute coordinate system in FIG. 4B, the height information is lost due to the definition of the absolute coordinate system that is uniquely defined to used the road surface as a reference position. Therefore, the distance compensation according to the projection angle of each laser beam may be preferably performed in the transformation to the absolute coordinate system because the height of each scan line of the laser beam, that is, the projection angle of each laser beam is different.

When the pedestrian is captured by the plural scan lines of the laser beam, the position of the pedestrian as the reflective object is plotted as a distribution in a circular area having a predetermined diameter in the absolute coordinate system. More practically, the distribution is defined as Gaussian distribution that has a higher detection frequency around the center of the distribution. In this manner, pedestrian data in the absolute coordinate system is distinctively characterized by using plural scan lines in the height direction, and is easily distinguished from other objects.

The absolute coordinate system has a mesh of predetermined size, e.g., a square of 50 cm or the like. When the reflective object is stopping, the object stays in a certain mesh. Therefore, the object in the same mesh for, for example, four consecutive detection intervals is determined as a stopping object, and the data of the stopping object is deleted. In this manner, the position data is shifted to have the data of the moving objects. That is, the position data of the moving objects is extracted. Therefore, grouping of the position data can be performed only for the moving objects.

In step S30, the process performs grouping processing that forms a group of the moving objects closely positioned with each other. The group formation is explained with reference to FIGS. 5A to 5D and FIGS. 6A to 6C.

Figure 5A:
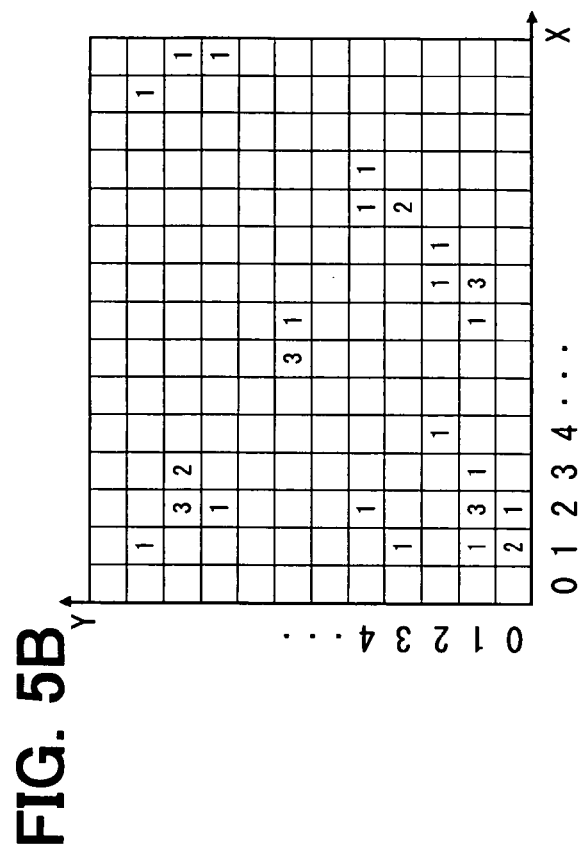
FIGS. 5A to 5D show illustrations of a grouping process that forms a group of close-by reflective objects exclusively out of the objects that are determined as moving objects.

As shown in FIG. 5A, the number of the position data of the moving objects in each mesh is counted after deleting the stopping objects in the absolute coordinate system. The illustration in FIG. 5A shows a portion of the detection area that includes the moving objects as the position data. The position data in FIG. 5A is counted to make count data as illustrated in FIG. 5B.

Figure 5C:
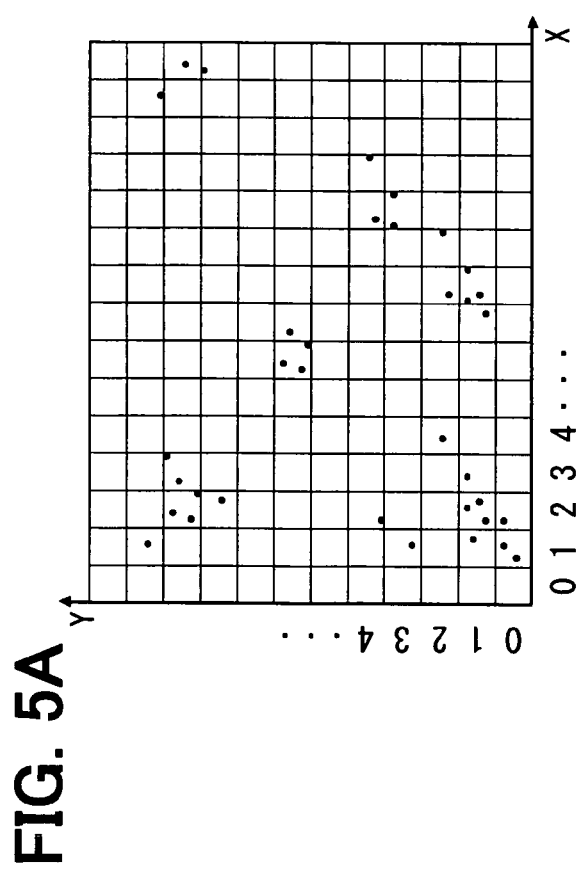
Figure 5B:
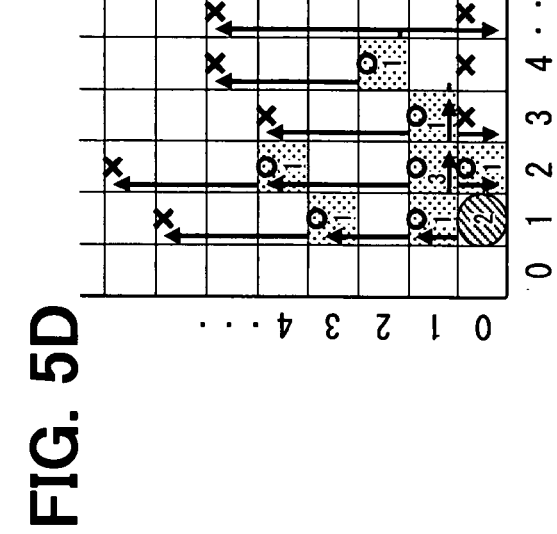

Then, a mesh having the position data is searched in Y axis direction from the origin of the coordinates as shown in FIG. 5C. In this case, there is no mesh having the position data in the column of X=0.

Figure 5D:
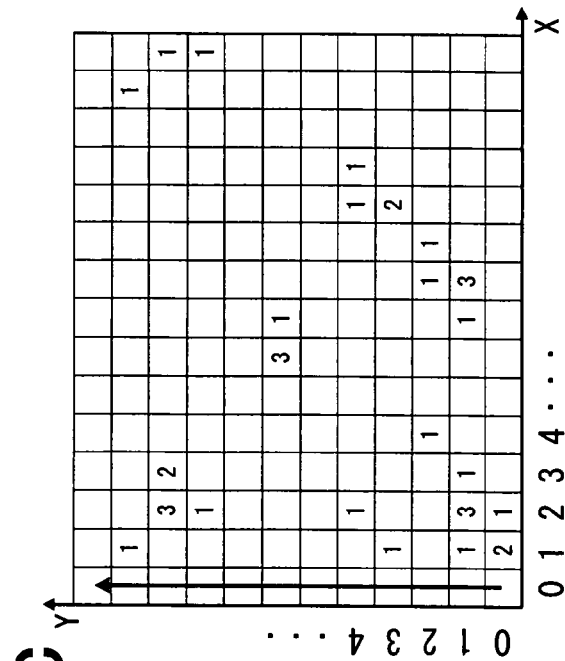

Then, the search of the mesh in the column X=1 is performed as shown in FIG. 5D. When a mesh having the position data is found, grouping of the position data is started. More practically, three meshes in both (positive and negative)

directions along Y axis are defined as a grouping search area for searching the position data when a certain mesh having the position data is found.

In an example shown in FIG. 5D, as the mesh (1, 0) has the position data, the search area reaches the mesh (1, 3). In this search area, the meshes (1, 1) and (1, 3) are determined to have the position data. Then, the search area is extended to the mesh (1, 6). In this manner, the search area is extended when the mesh with the position data is newly found in the search.

Then, the search of the position data is shifted by 1 to the X direction because the meshes (1, 4) to (1, 6) do not have the position data. In this case, as a weighted average of the meshes having the position data is 1, the search in the column X=2 starts at the (2, 1) for the range of three meshes in plus and minus directions. Then, the meshes (2, 0), (2, 1), (2, 4) are having the position data, and the weighted average of the mesh coordinate is calculated as Y=1.4. The value of Y is rounded to the whole number of 1, and Y=1 is used as the value of a proceeding count in X direction.

Figure 6A:
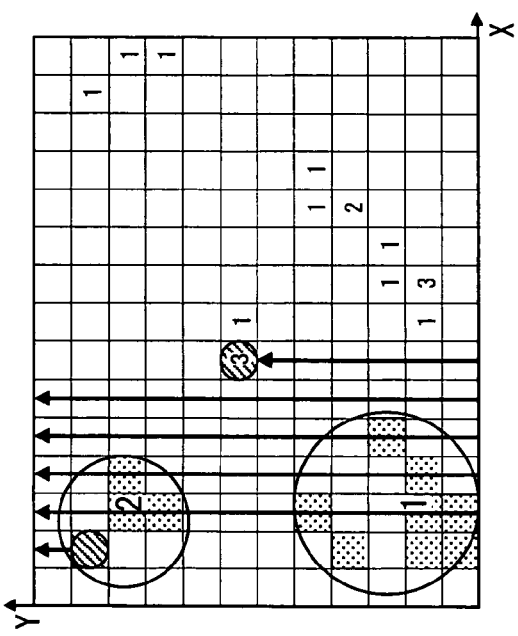
FIGS. 6A to 6C show yet other illustrations of the grouping process that forms the group of close-by reflective objects extracted out of the objects that are determined as moving objects.

Then, the columns of X=3, 4, 5 are searched in the same manner for the meshes with the position data. In this case, the mesh (5, 2) is used as a starting point of the mesh search for having no result, and the mesh search for grouping the position data concludes. Then, as shown in FIG. 6A, the position data to form a group is used to calculate the weighted average of the coordinate with the number of data taken into account, and the weighted average is determined as the center of the group of the reflective objects.

Figure 6B:
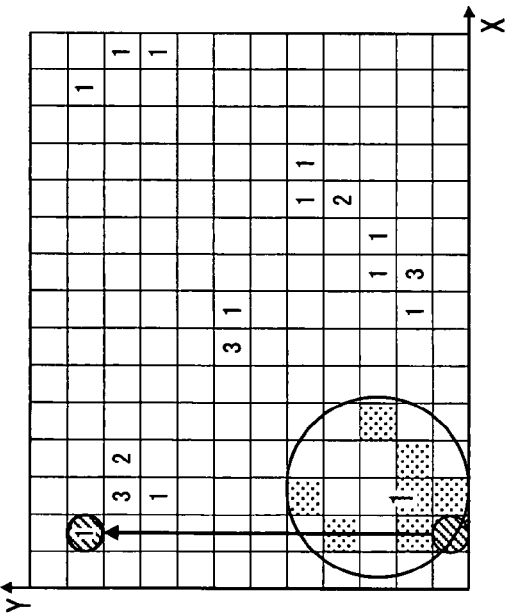
Figure 6C:
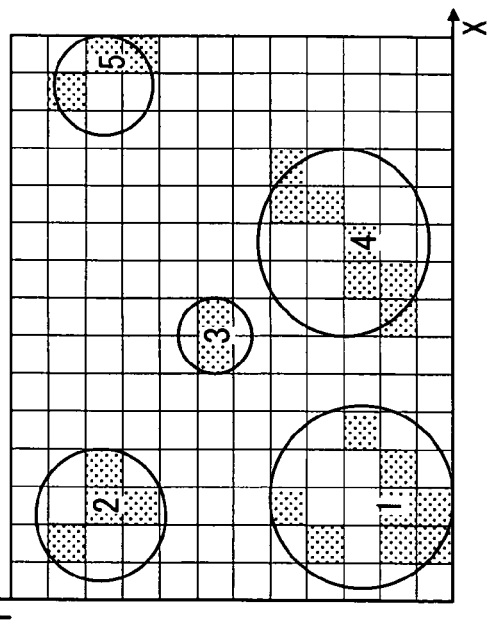

Then, the search returns to the start point for searching other position data that can be grouped. In this case, as shown in FIG. 6B, already grouped position data is excluded from the search. In this manner, all portions of the detection area having the position data are searched, and the object group data having close-by objects is generated.

Then, the pedestrian data is extracted from the from the object group data. For example, the size of the object group data is calculated from the number of the meshes occupied by an object group in step S40. For example, the object group having the size of 1 square meter is defined as a pedestrian, and is extracted as the pedestrian data. The, in step S50, the pedestrian data is tracked by using Kalman filter. The motion equation of Kalman filter and observation equation is shown in Equation 2 in the following. The filtering by the Kalman filter is performed based on the assumption that the pedestrian is modeled as an object of uniform motion, and the acceleration is considered as a noise.

Motion equation: $x_k = F x_{k-1} + G \Delta x_{k-1}$ [Equation 2]

Observation equation: $z_k = H_k x_k + L_k p_k + \Delta z_k$

In the Equation 2, a state variable x is defined as $x=[x, \dot{x}, y, \dot{y}]^T$, $\Delta x=[\Delta \ddot{x}, \Delta \ddot{y}]^T$ is an acceleration vector in a normal distribution having a variance value of Q and an average value of 0 (zero), an observation value $z=[z_x, z_y]^T$, $\Delta z$ is an observation error in a normal distribution having a variance value of R and an average value of 0 (zero).

Based on the above motion equation, positions and speeds of the tracked objects are calculated, and covariance value P of the error is derived from Equation 3 in the following.

$$\left.\begin{array}{l}\hat{x}_{k/k-1} = F\hat{x}_{k-1} \\ P_{k/k-1} = FP_{k-1}F^T + GQ_{k-1}G^T\end{array}\right\}$$ [Equation 3]

In this manner, as shown in FIGS. 7A to 7E, an estimation area of the tracked object according to the error is defined around the predicted value (i.e., around a predicted center position). Then, the predicted center position and the actual measurement is, as described later in detail, are statistically correlated. In this case, the predicted value is corrected by the actual measurement as shown in Equation 4.

$$\left.\begin{array}{l}\hat{x}_k = \hat{x}_{k/k-1} + K_k [z_k - H\hat{x}_{k/k-1}] \\ P_k = P_{k/k-1} - K_k H P_{k/k-1}\end{array}\right\}$$ [Equation 4]

In many cases where situation is complicated, as shown in FIG. 7A, for example, plural measurements may exist in the estimation area of one tracked object, or, as shown in FIG. 7B, plural tracked objects may be correlated with one measurement. Further, as shown in FIG. 7C, even when the number of the tracked objects is same as the number of the actual measurement, one of the actual measurement may be correlated with plural tracked objects by existing in an overlapping area of plural objects. In the present embodiment, Auction algorithm based on a likelihood function is used for securely correlate the tracked objects to the actual measurements. In addition, FIG. 7D shows an example situation where the one of two measurements belongs to the estimation area of the tracked object, with the other measurement existing in an outside of the estimation area of the tracked object. Further, FIG. 7E shows an example situation where no actual measurement is found in the estimation area of the tracked object.

The correlation described above may be generalized in the following manner. That is, as shown in Equation 5, when the number of the tracked objects is N, the number of the actual measurements in the estimation area is M, a variable $a_{nm}$ taking binary value of either of 0 or 1 is defined in the following manner for correlating an actual measurement with a tracked object. In this case, $a_{nm}$ is equal to 1 when the measurement m and the object n are correlated, and $a_{nm}$ is equal to 0 (zero) for the other values of m and n ($1 \leq m \leq M$, $1 \leq n \leq N$).

$$\left.\begin{array}{l}\sum_{m=1}^{M+N} a_{nm} = 1 \quad \text{for } n = 1, \ldots, N, N+1, \ldots, N+M \\ \sum_{n=1}^{N+M} a_{nm} = 1 \quad \text{for } n = 1, \ldots, M, M+1, \ldots, M+N\end{array}\right\}$$ [Equation 5]

In this case, when $n \geq N+1$ and $m \leq M$, the actual measurement corresponding to the tracked object cannot be detected due to shading, combination, or the like. When $n \leq N$ and $m \geq M+1$, the actual measurement does not exist because the measurement comes from newly introduced object or the like. In this case, the boundaries $n \geq N+1$ and $m \geq M+1$ are set for convenience' sake.

The correlation between the actual measurement and the tracked object is, in other words, to find an optimum assignment a*, and finding the optimum assignment a* is identical to a maximization of the likelihood function $P[Z_k|a]$ under a condition given by Equation 5. Therefore, the correlation between the actual measurement and the tracked object is standardized as a minimum value search as described in Equation 6.

$$\text{Optimum assignment } a^* = \arg\min_a \sum_{n=1}^{N+M} \sum_{m=1}^{N+M} a_{nm} c_{nm}$$ [Equation 6]

-continued

The cost function $c_{nm}$ in Equation 6 is given by Equation 7 in the following $$c_{nm} = \begin{cases} \ln[\lambda_D V_{VG} L_{nm,k|k-1}] & \text{for } n \leq N, m \leq M \\ \ln[l - \lambda_D] & \text{for } n \leq N, m \geq M+1 \\ 0 & \text{for } n \geq N+1 \end{cases} \quad \text{[Equation 7]}$$

$\lambda_D$: Detection rate of the tracked object $V_{VG}$: Estimation area $L_{nm}$: Likelihood function when actual measurement $m$ correlates to tracked object $n$ In this case, depending on the positional relationship of plural pedestrians in an actual environment, the actual measurement representing each pedestrian may often be shaded, combined, divided. To cope with those situations, rule base tracking management is introduced. More practically, when shading and/or combination are observed, an extrapolation based on a predicted value of the position of the tracked object by Kalman filtering is used. That is, even when there is no actual measurement that corresponds to the predicted value, a new predicted value is calculated based on the previously calculated predicted value. The extrapolation of the predicted value is continued for a predetermined number of detection intervals. On the other hand, when division is observed, a new object is tracked after concluding unsuccessful extrapolation for correlating the actual measurement for a certain period.

Although the present invention has been fully described in connection with the preferred embodiment thereof with reference to the accompanying drawings, it is to be noted that various changes and modifications will become apparent to those skilled in the art.

For example, the method and the apparatus in the present embodiment may be used to recognize a pedestrian in a rear direction and/or in a lateral direction of the vehicle instead of recognizing- the pedestrian in front of the vehicle.

Further, the method and the apparatus may be used for, for example, recognizing an intruder in a certain area instead of recognizing the pedestrian for use in the vehicle. More practically, the intruder in the certain area may be automatically scanned and detected without manual operation by installing the laser radar of the present disclosure.

Such changes and modifications are to be understood as being within the scope of the present invention as defined by the appended claims.

What is claimed is:

1. A pedestrian recognition apparatus comprising:
a radar unit for emitting a radar beam therefrom and receiving a reflected beam that is reflectively redirected by a reflective object when scanning of a detection area by the radar beam is performed in plural scan lines at a predetermined detection interval;
a reflective object detection unit for detecting a position of the reflective object as two-dimensional coordinates in a predetermined coordinate system based on a result of emission of the radar beam and reception of the reflected beam by the radar unit;
an object determination unit for determining whether the reflective object is a stopping object or a moving object based on a positional change of the reflective object represented by the two-dimensional coordinates in the predetermined coordinate system derived from plural times of position detection of the reflective object at the predetermined detection interval; and
a pedestrian recognition unit for recognizing a pedestrian, wherein pedestrian recognition is performed as formation of the object group of close-by reflective objects for forming an object group of the reflective objects in the two-dimensional coordinates in the predetermined coordinate system out of the reflective objects determined as the moving object based on a determination result by the object determination unit, the formation of the object group succeeded by determination of a group size of the object group based on a predetermined criterion of the group size for associating the object group with the pedestrian.

2. The pedestrian recognition apparatus as in claim 1 further comprising:
a motion detection unit for detecting a motion of a subject vehicle,
wherein the pedestrian recognition apparatus is disposed in the subject vehicle,
the object determination unit uses an absolute coordinate system with an arbitrarily determined origin as the predetermined coordinate system for defining the two-dimensional coordinates of an object position,
the position of the subject vehicle is calculated as coordinates in the absolute coordinate system based on a detection result of the motion detection unit, and
positional relationship of the subject vehicle relative to the position of the reflective object in the absolute coordinate system is used in association with the position of the subject vehicle for a calculation of the coordinates of the position of the reflective object.

3. The pedestrian recognition apparatus as in claim 2,
wherein the reflective object detection unit calculates the coordinates of the position of the subject vehicle by adopting a model that changes a slip angle according to a travel speed of the subject vehicle when the subject vehicle is in a turning motion.

4. The pedestrian recognition apparatus as in claim 2,
wherein the radar unit emits plural radar beams in vertically and horizontally different directions,
the plural radar beams in the vertically different directions are controlled to be reflected by the pedestrian, and
the reflective object detection unit determines a position of the reflective object detected by the plural radar beams in the vertically different directions by two-dimensional location coordinates that is commonly used to locate an object position on a road surface in the two-dimensional coordinate system.

5. The pedestrian recognition apparatus as in claim 1,
wherein the pedestrian detection unit calculates a predicted position of the object group of the reflective objects being determined as the pedestrian by applying Kalman filter that considers an acceleration component as the noise based on an assumption that the object group of the reflective objects is a body in a uniform motion, and
the pedestrian detection unit tracks the object group of the reflective objects based on a predetermined relationship between the predicted position and an actual measurement of the coordinates of the position of the object group of the reflective objects.

6. The pedestrian recognition apparatus as in claim 5,
wherein the pedestrian detection unit calculates the predicted position of the object group of the reflective objects being determined as the pedestrian even when the predetermined relationship between the predicted position and the actual measurement of the coordinates of the position of the object group of the reflective object is discrepant, and the pedestrian detection unit continues to track the object group of the reflective objects based on the predetermined relationship between the predicted position and the actual measurement of the coordinates of the position of the object group of the reflective object at the predetermined detection interval for a predetermined number of times after the discrepancy is detected.

7. A pedestrian recognition method comprising:

emitting a radar beam and receiving a reflected beam that is derived as a result of reflective redirection of the radar beam by a reflective object when scanning of a detection area by the radar beam is performed in plural scan lines at a predetermined detection interval;

detecting a position of the reflective object as two-dimensional coordinates in a predetermined coordinate system based on a result of emission of the radar beam and reception of the reflected beam;

determining whether the reflective object is a stopping object or a moving object based on a positional change of the reflective object represented by the two-dimensional coordinates in the predetermined coordinate system as a result of plural times of scanning of the reflective object at the predetermined detection interval; and performing pedestrian recognition, wherein the pedestrian recognition is performed as formation of an object group of close-by reflective objects for forming the object group of the reflective objects in the two-dimensional coordinates of the predetermined coordinate system out of the reflective objects determined as the moving object based on a determination result that each of the reflective objects is one of the stopping object and the moving object, the formation of the object group succeeded by determination of a group size of the object group based on a predetermined criterion of the group size for associating the object group with the pedestrian.

8. The method as in claim 7 further comprising:

detecting a motion of a subject vehicle, wherein the pedestrian recognition is performed in the subject vehicle for recognizing a pedestrian in a proximity of the subject vehicle, the predetermined coordinate system for defining the two-dimensional coordinates of an object position is an absolute coordinate system having an arbitrarily determined origin, the position of the subject vehicle is calculated as coordinates in the absolute coordinate system based on a detection result of the motion of the subject vehicle, and positional relationship of the subject vehicle relative to the position of the reflective object in the absolute coordinate system is used in association with the position of the subject vehicle for a calculation of the coordinates of the position of the reflective object.

9. The method as in claim 8, wherein calculation of the coordinates of the position of the subject vehicle is performed by adopting a model that changes a slip angle according to a travel speed of the subject vehicle when the subject vehicle is in a turning motion.

10. The method as in claim 8, wherein plural radar beams are emitted in vertically and horizontally different directions, the plural radar beams in the vertically different directions are controlled to be reflected by the pedestrian, and a position of the reflective object detected by the plural radar beams in the vertically different directions is determined as plural sets of coordinates that is commonly used to locate an object position on a road surface in the two-dimensional coordinate system.

11. The method as in claim 7, wherein calculation of a predicted position of the object group of the reflective objects being determined as the pedestrian is performed by applying Kalman filter that considers an acceleration component as a noise based on an assumption that the group of the reflective objects is a body in a uniform motion, and tracking of the object group of the reflective object is performed based on a predetermined relationship between the predicted position and an actual measurement of the coordinates of the position of the object group of the reflective objects.

12. The method as in claim 11, wherein calculation of the predicted position of the object group of the reflective objects being determined as the pedestrian is performed even when the predetermined relationship between the predicted position and the actual measurement of the coordinates of the position of the object group of the reflective object is discrepant, and tracking of the object group of the reflective objects is continued based on the predetermined relationship between the predicted position and the actual measurement of the coordinates of the position of the object group of the reflective object at the predetermined detection interval for a predetermined number of times after the discrepancy is detected.

* * * * *